United States Patent
Coq et al.

(10) Patent No.: US 10,831,212 B2
(45) Date of Patent: Nov. 10, 2020

(54) AUTONOMOUS ROVING VEHICLE MANAGEMENT USING LASER BARRIERS

(71) Applicant: International Business Machines Corporation, Armonk, NY (US)

(72) Inventors: Marc H. Coq, Hopewell Junction, NY (US); William J. Green, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 175 days.

(21) Appl. No.: 16/135,245

(22) Filed: Sep. 19, 2018

(65) Prior Publication Data

US 2020/0089248 A1   Mar. 19, 2020

(51) Int. Cl.
*G05D 1/02* (2020.01)
*G05D 1/00* (2006.01)

(52) U.S. Cl.
CPC ......... *G05D 1/0236* (2013.01); *G05D 1/0088* (2013.01); *G05D 2201/0208* (2013.01); *G05D 2201/0215* (2013.01)

(58) Field of Classification Search
CPC ......... G05D 1/0088; G05D 2201/0208; G05D 2201/0215
See application file for complete search history.

(56) References Cited

U.S. PATENT DOCUMENTS

| 6,108,076 A | 8/2000 | Hanseder |
| 6,240,342 B1 | 5/2001 | Fiegert et al. |
| 6,255,793 B1 | 7/2001 | Peless et al. |
| 2011/0190931 A1 | 8/2011 | Anderson et al. |
| 2011/0295423 A1 | 12/2011 | Anderson |
| 2015/0134144 A1 | 5/2015 | Bron et al. |

(Continued)

FOREIGN PATENT DOCUMENTS

| EP | 1886549 A1 | 2/2008 |
| EP | 2336802 A1 | 6/2011 |

(Continued)

OTHER PUBLICATIONS

K. M. Hasan, Abdullah-Al-Nahid and K. J. Reza, "Path planning algorithm development for autonomous vacuum cleaner robots," 2014 International Conference on Informatics, Electronics & Vision (ICIEV), Dhaka, 2014, pp. 1-6.

(Continued)

*Primary Examiner* — Anne Marie Antonucci
(74) *Attorney, Agent, or Firm* — Cantor Colburn LLP; Tihon Poltavets

(57) ABSTRACT

Methods, systems and computer program products for defining a functional area of operation of an autonomous roving vehicle with laser barriers are provided. Aspects include one or more laser barriers. Aspects also include a controller configured to selectively activate and/or deactivate a selection of the one or more laser barriers to define a functional area. Aspects also include an autonomous roving vehicle including one or more sensors capable of detecting a laser barrier. The autonomous roving vehicle being configured to autonomously rove within the functional area and change direction to remain within the functional area upon detecting a laser barrier.

18 Claims, 8 Drawing Sheets

(56) References Cited

U.S. PATENT DOCUMENTS

| | | | |
|---|---|---|---|
| 2015/0328775 A1 | 11/2015 | Shamlian et al. | |
| 2016/0282862 A1* | 9/2016 | Duffley | G05D 1/0016 |
| 2016/0298970 A1* | 10/2016 | Lindhe | A47L 11/4041 |
| 2017/0146654 A1 | 5/2017 | Halloran et al. | |
| 2019/0061157 A1* | 2/2019 | Suvarna | G05D 1/0274 |

FOREIGN PATENT DOCUMENTS

| | | |
|---|---|---|
| EP | 2946650 A1 | 11/2015 |
| WO | 2014032569 A1 | 3/2014 |
| WO | 2014047557 A1 | 3/2014 |
| WO | 2016057140 A1 | 4/2016 |
| WO | 2016057185 A1 | 4/2016 |

OTHER PUBLICATIONS

Sahin, Haydar, et al; "Household robotics: autonomous devices for vacuuming and lawn mowing [Applications of control]." IEEE Control Systems 27.2 (2007): 20-96.

\* cited by examiner

US 10,831,212 B2

AUTONOMOUS ROVING VEHICLE MANAGEMENT USING LASER BARRIERS

BACKGROUND

The present invention generally relates to autonomous roving vehicle management, and more specifically, to defining a functional area of operation of an autonomous roving vehicle with laser barriers.

Autonomous roving vehicles are commonly used as vacuum cleaners and may be used for other similar functions such as cutting grass or picking up garbage. Such vehicles typically move around in somewhat random patterns and changing directions when sensors detect that the vehicle has made contact with a physical object such as a wall, a chair, a tree, or some other obstruction. However, in some cases, such autonomous roving vehicles may wander into undesirable areas in which the vehicle may be at risk of getting stuck or run into other problems. For example, an autonomous roving vacuum cleaner may get stuck on a thick carpet, or fall down a set of stairs. In such cases, a user may be required to erect physical boundaries to prevent such undesired results by, for example, creating a physical barrier out of a rolled-up rug. Some roving vehicles may attempt to map a room or utilize GPS data to navigate along a predetermined path, but these solutions can be expensive (requiring lots of onboard memory and equipment) and may nonetheless be faulty when the environment is changed (e.g., furniture is moved around) or the environment may include areas that are not GPS accessible.

SUMMARY

Embodiments of the present invention are directed to a computer-implemented method for defining a functional area of operation of an autonomous roving vehicle with laser barriers. A non-limiting example of the computer-implemented method includes activating a group of one or more laser barriers to define a functional area by a controller. The method also includes activating an autonomous roving vehicle including one or more sensors capable of detecting a laser barrier. The autonomous roving vehicle can be configured to autonomously rove within the functional area and change direction to remain within the functional area upon detecting a laser barrier.

Embodiments of the present invention are directed to a system for defining a functional area of operation of an autonomous roving vehicle with laser barriers. The system includes one or more laser barriers. The system further includes a controller configured to selectively activate and/or deactivate a selection of the one or more laser barriers to define a functional area. The system further includes an autonomous roving vehicle including one or more sensors capable of detecting a laser barrier. The autonomous roving vehicle can be configured to autonomously rove within the functional area and change direction to remain within the functional area upon detecting a laser barrier.

Embodiments of the invention are directed to a computer program product for defining a functional area of operation of an autonomous roving vehicle with laser barriers, the computer program product comprising a computer readable storage medium having program instructions embodied therewith. The computer readable storage medium is not a transitory signal per se. The program instructions are executable by a processor to cause the processor to perform a method. A non-limiting example of the method includes activating a group of one or more laser barriers to define a functional area by a controller. The method also includes activating an autonomous roving vehicle including one or more sensors capable of detecting a laser barrier. The autonomous roving vehicle can be configured to autonomously rove within the functional area and change direction to remain within the functional area upon detecting a laser barrier.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 6A-6C 5 depicts a top view of an exemplary floor plan in which a system for defining a functional area of operation of an autonomous roving vehicle with laser barriers is implemented according to one or more embodiments of the invention; and The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Figure 1:
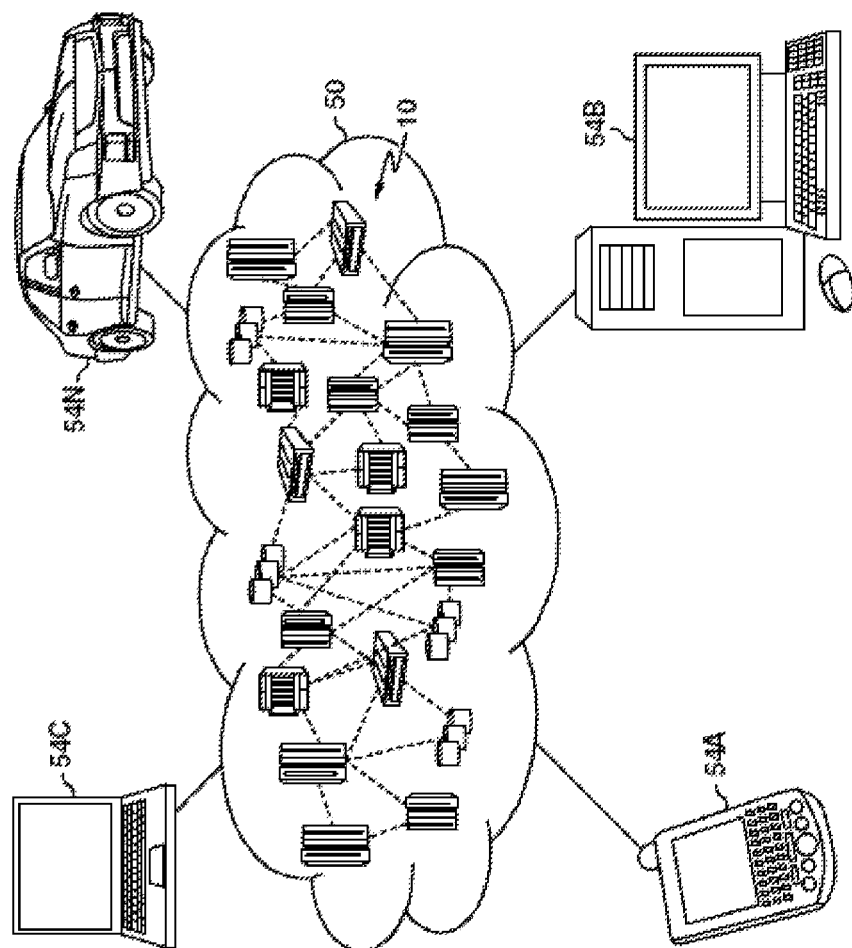
FIG. 1 depicts a cloud computing environment according to one or more embodiments of the present invention.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
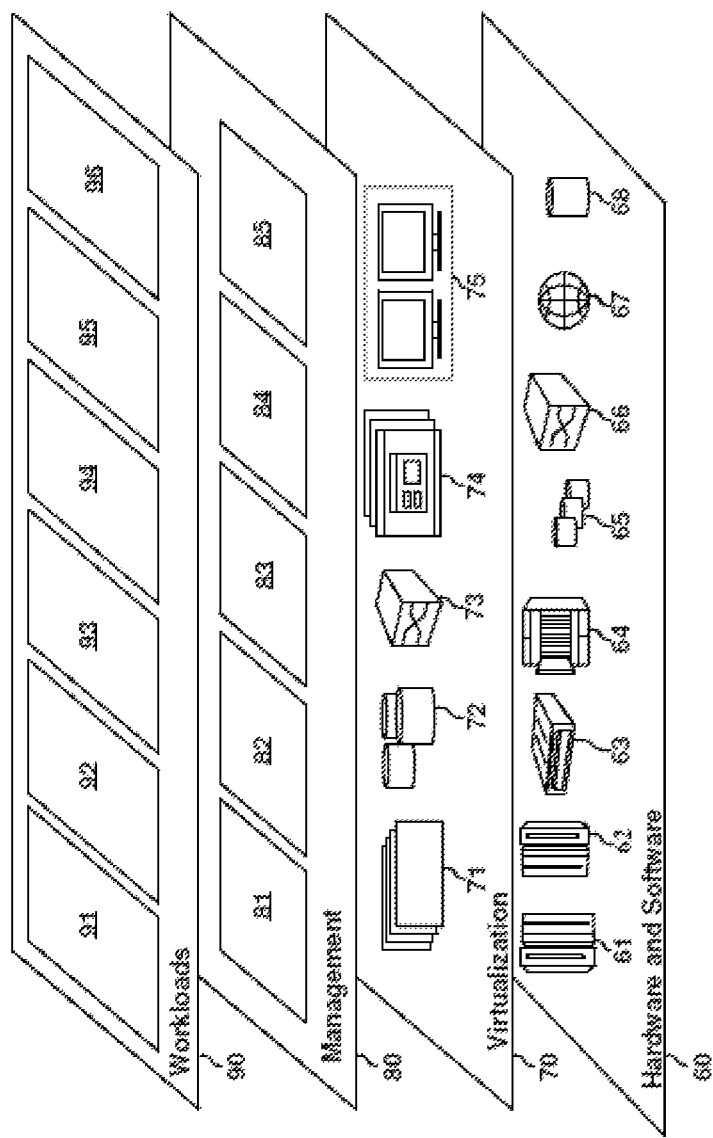
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and defining a functional area of operation of an autonomous roving vehicle with laser barriers 96.

Figure 3:
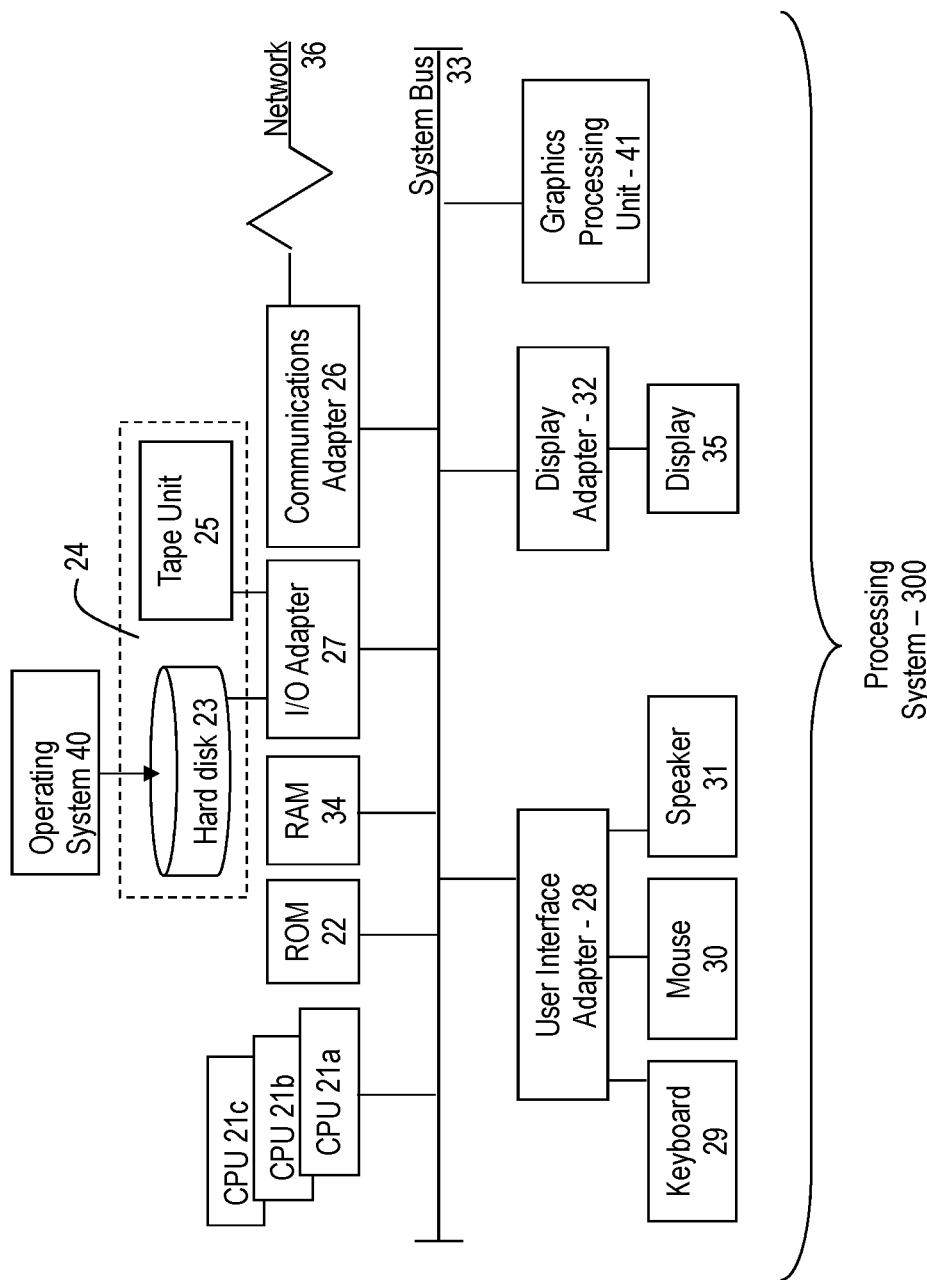
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for defining a functional area of operation of an autonomous roving vehicle with laser barriers is provided. In exemplary embodiments, an environment, such as a house, a building, a yard, a field, or any other location in which autonomous roving vehicles such as autonomous roving vacuum cleaners or lawn mowers can be used, can be equipped with one or more laser barrier devices. For example, a doorway can be equipped with a fixed (i.e., permanently installed) laser barrier device that is configured to generate a laser barrier across the doorway when activated. Similarly, movable laser barrier devices may be set up ad hoc by a user to define laser barriers across selected areas. Further, laser barrier projector devices may be mounted on a wall or a ceiling and can be configured to project laser barriers of configurable shapes onto a floor or around particular objects. An autonomous roving vehicle (e.g., an autonomous roving vacuum cleaner) includes one or more sensors that are capable of detecting a laser barrier upon approaching the laser barrier. When activated, the autonomous roving vehicle may move about an area in a pseudo-random fashion and upon detecting a nearby laser barrier, the autonomous vehicle is configured to stop or change direction such that it does not cross the boundary defined by the laser barrier. A controller can be configured to control the activation or deactivation of each of the laser barriers in the system to changeably define a functional area of operation of the autonomous roving vehicle. The controller can include rules and may receive signals from other devices (e.g., TV, smartphone, washing machine, etc.) to make real-time determinations about how to define the functional area. For example, if the controller determines that the TV is on in the living room, the controller may activate a laser barrier in a doorway leading to the living room to prevent an autonomous roving vacuum from entering the living room and disturbing the viewers of the TV. A configurable system of defining and remotely redefining a functional area of a roving vehicle using laser barriers is advantageous over other systems that may reflective boundaries detectable by laser range finders that may take a long time to manually set up, are not remotely reconfigurable, and are not used to restrict vehicle access, RFID boundary systems that may be imprecise at defining boundaries and suffer from interference from other electrical devices, or GPS-based systems that may utilize a lot of resources (e.g., high power-consumption) and may suffer from lack of GPS-covered areas.

As will be appreciated by those of skill in the art, the term "laser barrier" as used herein may refer to one or more beams of light of a given frequency. Such laser barriers may exist in the visible or invisible spectrum of light. Generally speaking, laser barriers may be "eye-safe," meaning that they may be configured to do no harm to any people or animals that may view or come into contact with them. As will be appreciated, laser barrier devices may be configured to create laser barriers of light having any number of different wavelengths and the autonomous roving vehicle can include sensors that are configured to detect whichever wavelength of light is selected for use by the system. The laser barriers described herein define a boundary intended to contain the autonomous roving vehicle and do not present any physical encumbrance to the movement of the vehicle or other objects or individuals that should cross the path of a laser barrier.

Figure 4:
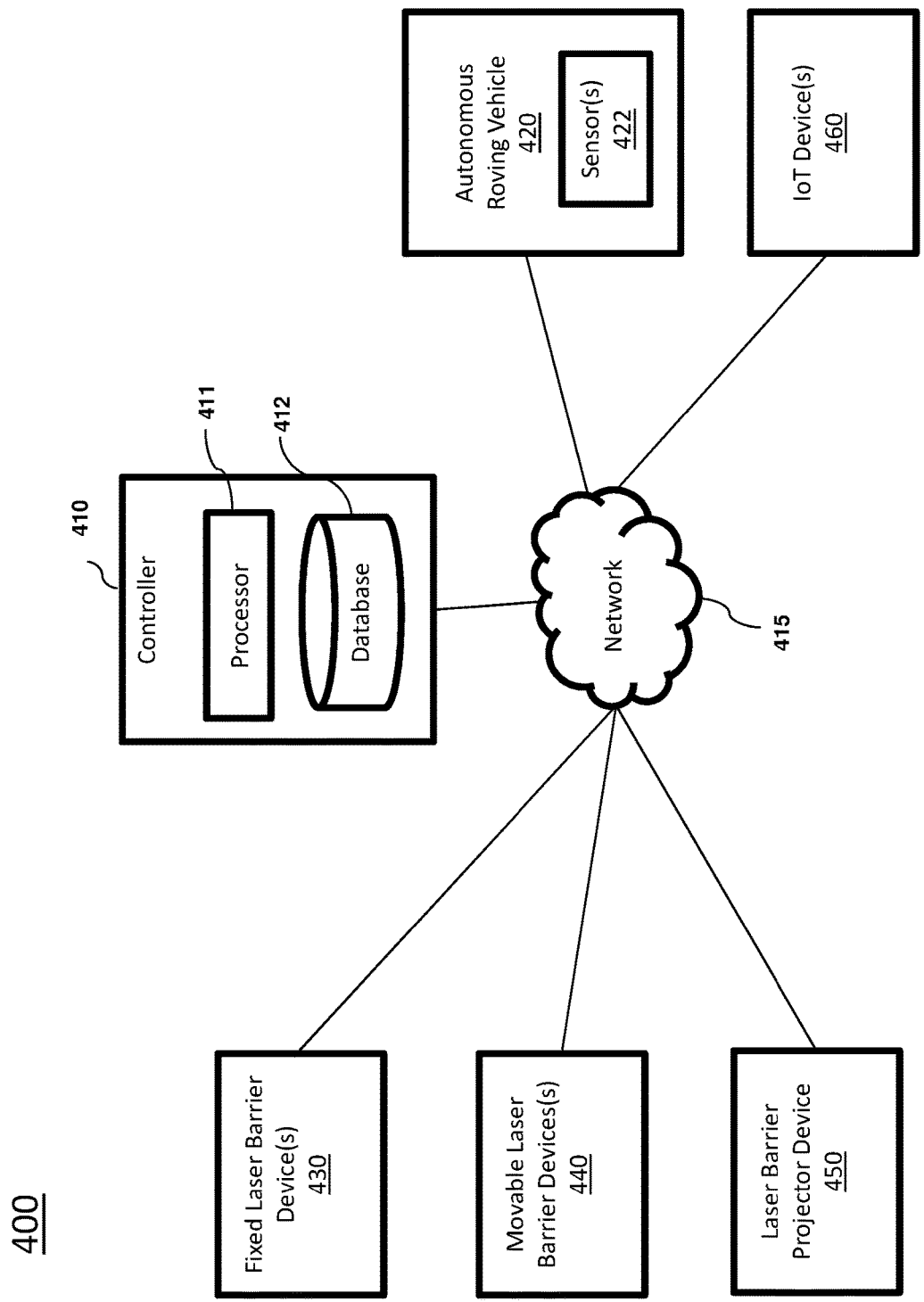
FIG. 4 depicts a system upon which defining a functional area of operation of an autonomous roving vehicle with laser barriers maybe be implemented according to one or more embodiments of the present invention.

Turning now to FIG. 4, a system 400 for defining a functional area of operation of an autonomous roving vehicle with laser barriers will now be described in accordance with an embodiment. The system 400 includes a controller 410 in communication with autonomous roving vehicle 420, fixed laser barrier device(s) 430, movable laser barrier device(s) 440, laser barrier projector device 450 and Internet-of-Things (IoT) device(s) 460 via communications network 415. Each of the controller 410, the autonomous roving vehicle 420, the laser barrier device(s) 430, 440, 450, and the IoT devices 460 may include some or all of the aspects of processing system 300 described with respect to FIG. 3. Controller includes a processor 411 for processing data and instructions and databased 412 for storing rules that controller 410 can use to determine which laser barriers to activate at a given moment in time. For example, the rules may dictate that a first set of laser barriers be activated during a first time period to define a first functional area, and then a second set of laser barriers be activated during a second time period to define a second functional area. In some embodiments, the rules may cause controller 410 to dynamically change which laser barriers are activated and which are not based on environmental changes (e.g., objects being moved around, other devices being activated, people being present in a room, etc.). The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). Accordingly, each of the controller 410, autonomous roving vehicle 420, fixed laser barrier device(s) 430, movable laser barrier device(s) 440 and laser projector device(s) 450, and IoT device(s) 460 include a transceiver for communicating via network 415 and/or a wired connection to network 415 to facilitate communication between the devices.

The autonomous roving vehicle 420 is configured to pseudo-randomly move about a functional area defined by a number of activated laser barriers to perform a function such as vacuuming, picking up garbage, cutting grass, or the like. Autonomous roving vehicle 420 includes one or more sensors 422, such as one or more optical sensors for detecting laser barriers that are generated by one or more laser barrier devices. A sensor for detecting laser barriers may include an optical sensor that is capable of detecting light and/or properties of light, such as the wavelength of the light. For example, a sensor may include a filter that only allows light of a specified wavelength or frequency to permeate the filter and be detected by the sensor. In some embodiments, a sensor may detect a variety of different light sources and a processor associated with the autonomous roving vehicle 420 may determine whether light having the characteristics of a laser barrier has been detected. According to some embodiments, one or more optical sensors may be positioned on one or more of the front, back, side(s), bottom or top of the autonomous roving vehicle 420 that are capable of detecting a laser barrier upon coming into contact with the laser barrier. For example, if the autonomous roving vehicle 420 has an optical sensor on the front of the vehicle and the vehicle is moving towards a doorway having an activated laser barrier, when the optical sensor crosses or enters into the space occupied by the laser barrier, the optical sensor will detect the presence of the laser barrier and cause the vehicle to stop or change course. In some embodiments, optical sensors for detecting light barriers may be configured to detect the light barrier at some distance (e.g., two inches) before the vehicle enters into the space occupied by the laser barrier. In some embodiments, an optical sensor may be positioned on autonomous roving vehicle 420 at an angle to specify a detection distance. For example, an optical sensor on the front of autonomous roving vehicle 420 may be angled at 45 degrees such that it may detect objects and light at a distance in front of the vehicle that is a function of the 45-degree angle. In some embodiments, an autonomous roving vehicle 420 may include an optical sensor positioned on top of the vehicle that may detect laser barriers in a 360-degree field of vision. According to some embodiments, autonomous roving vehicle 420 may include other sensors 422 such as an image capture device (e.g., a digital camera) for obtaining images and/or video, or sensors that are configured to detect that the autonomous roving vehicle 420 has made physical contact with an object (e.g., the vehicle bumps into a physical wall), which may also be used to stop or change the vehicle's direction of movement.

In some embodiments, a fixed laser barrier device 430 may be configured to be installed at a fixed location. For example, a fixed laser barrier device 430 may be installed in a doorway such that when activated the fixed laser barrier device 430 generates a laser barrier that spans the doorway. According to some embodiments, fixed laser barriers 430 may be installed in a horizontal orientation such that the fixed laser barrier 430 generates a laser barrier that is parallel to the ground. Such fixed laser barriers 430 can be installed at a height that is configured to align with the height of a sensor 422 of an autonomous roving vehicle 420. In some embodiments, a fixed laser barrier device 430 may be installed in a vertical orientation to generate a laser barrier that spans the vertical length of a doorway. According to some embodiments, a laser barrier (e.g., of a doorway) may be made up of a plurality of fixed laser barrier devices 430 installed parallel to one another (e.g., a plurality of laser devices arranged in a row and spaced apart by 2 inches each) to form a field of plurality of parallel lasers when activated. According to some embodiments, a fixed laser barrier device 430 may be used in conjunction with one or more reflectors to define a laser barrier having an angled shape. For example, using a reflector, a single fixed laser barrier device 430 may be capable of creating a laser barrier that in the shape of two straight lines that connected at the reflector and have an angle between them. In some embodiments, laser barrier devices may be positioned in doorways, door jams, walls, ceilings, underneath a translucent floor, or many other locations. It should be appreciated that there are many different possible configurations of fixed laser barrier devices 430 (and reflectors) that can be used to create a desired laser barrier, based on the nature of the environment.

Movable laser barrier devices 440 may operate in a manner similar to fixed laser barriers 430 described above, however, movable laser barriers 440 may be removably positioned by a user in an ad hoc fashion. For example, if a user spills a liquid in the kitchen and does not want the vacuum to come into contact with the liquid, the user may place a movable laser barrier device 440 on the floor to create a laser barrier across a portion of the kitchen to prevent the an autonomous roving vacuum 420 from entering that area of the kitchen. In some embodiments, movable laser barrier devices 440 may be manually activated by a user (e.g., by turning them on or off). In some embodiments, a movable laser barrier device 440 may be activated and deactivated by the controller 410. In some embodiments, a movable laser barrier device 440 may include a location sensor to that determines the location and orientation of the movable laser barrier device 440 so that the controller 410 may know where the movable laser barrier device 440 is in relation to the environment and the other laser barrier devices. In some embodiments, the system 400 may determine where the location and the orientation a movable laser barrier device 440 is by, for example, observing it with an image capture device using image recognition techniques or in response to a user input that indicates the location of the movable laser barrier device 440.

As will be appreciated by those of skill in the art, devices for creating lasers (e.g., laser pointers) are known, and any such type of device may be used or incorporated into the laser barrier devices described herein to create laser barriers. Each of the laser barrier devices described herein are communicatively connected to the controller 410, which may remotely activate and deactivate the laser barrier devices to selectively activate or deactivate each laser barrier.

According to some embodiments, a laser barrier projector device 450 is a device that can be mounted (e.g., on a wall or ceiling) or placed (e.g. on top of a stand) in a location in which it is positioned to project a laser barrier pattern onto a surface such as a floor. In some embodiments, a laser barrier projector device 450 can be mounted on the ceiling, and may be configured to project light onto the floor in configurable shapes and patterns that may be controlled and changed by the controller 410. For example, if a room contains a delicate object, such as a piece of art work, the laser barrier projector device 450 can be configured to project a laser barrier around the piece of art work to prevent the autonomous roving vehicle 420 from running into the art work. In some embodiments, if the art work is moved to a different location in the room, the laser barrier projector device 450 can be configured to adjust the location of the projected laser barrier shape to provide the laser barrier at the new location of the art work. Likewise, in some embodiments, if the shape or size of the artwork changes, the laser barrier projector device 450 can be configured to change the shape and/or size of the projected laser barrier pattern to provide a more appropriately sized and shaped boundary around the artwork. In some embodiments, laser barrier projector device 450 may include an image capture device such as digital camera for observing the environment. In some embodiments, images from the digital camera may be processed (e.g., by the controller 410) using image recognition techniques to recognize an object or individual and its location. Controller 410 can be configured to receive a user input indicating a delicate object or an individual that the user wants to protect from the autonomous roving vehicle 420 and the controller 410 can, based on the recognized image of the object/individual, determine the location of the object/individual, generate an appropriate laser barrier pattern to be applied around the object/individual, and instruct the laser barrier projector device 450 to generate and project the specified laser barrier pattern around the object/individual.

As will be appreciated, a home or other environment may include a plurality of IoT devices 460, such as smart TVs, radios, mobile phones, appliances, dishwashers, washing machines, lights, speakers, motion detectors, and the like. Controller 410 can be configured to receive signals from one or more IoT device(s) 460 to determine various actions occurring in the environment and can redefine the functional area based on the signals received from the one or more IoT device(s) 460. For example, controller 410 may determine that people are watching TV because a TV is turned on in the living room and the controller 410 may redefine the functional area to prevent the autonomous roving vehicle 420 from entering the living room and disturbing the viewer's enjoyment of watching TV. According to some embodiments, controller 410 may include stored rules that controller 410 uses to determine which laser barriers to activate at which times. In some embodiments, controller 410 may be configured to dynamically change which laser barriers are activated based on environmental changes that can be determined based on signals from one or more IoT devices 460. For example, if controller 410 determines that a TV 460 is turned on in the living room, then controller 410 may activate and/or deactivate various laser barriers to redefine the functional area to exclude the living room so that viewers of the TV are not disturbed. In another example, motion detectors may detect when people are in a room, and the rules may specify to prevent the autonomous roving vehicle 420 from entering an occupied room. As will be understood, rules may dictate any number or variety of different circumstances that may influence the determination of what area should constitute the current functional area. According to some embodiments, one or more rules may be user-specified to allow a user to customize the operation of the autonomous roving vehicle 420 based on the user's preferences and behaviors.

Figure 5:
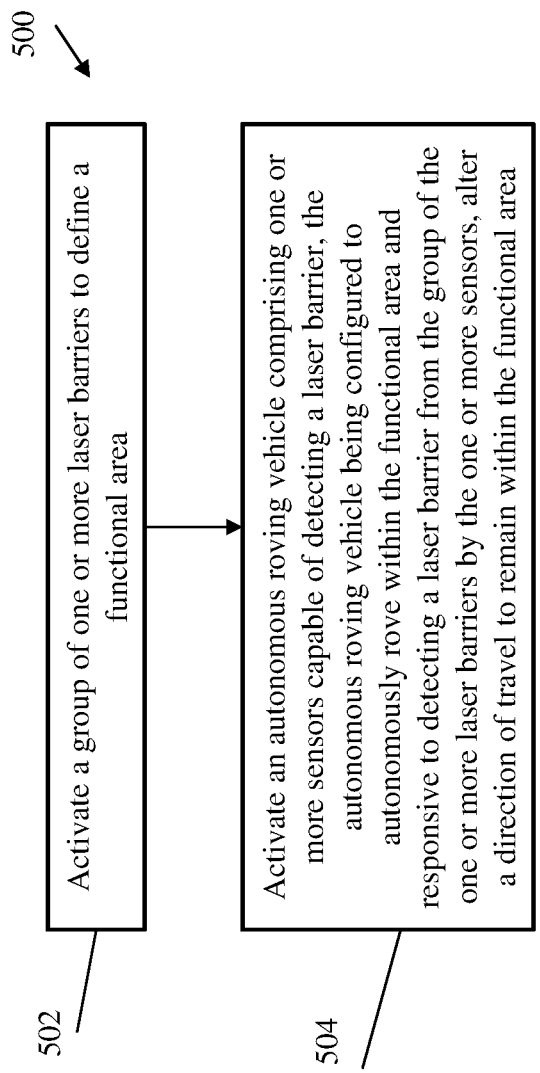
FIG. 5 depicts a flow diagram of a method for defining a functional area of operation of an autonomous roving vehicle with laser barriers according to one or more embodiments of the invention.

Turning now to FIG. 5, a flow diagram of a method 500 for defining a functional area of operation of an autonomous roving vehicle with laser barriers in accordance with an embodiment is shown. In one or more embodiments of the present invention, the method 500 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described hereinabove and illustrated in FIG. 3, or in some other type of computing or processing environment.

Figure 6A:
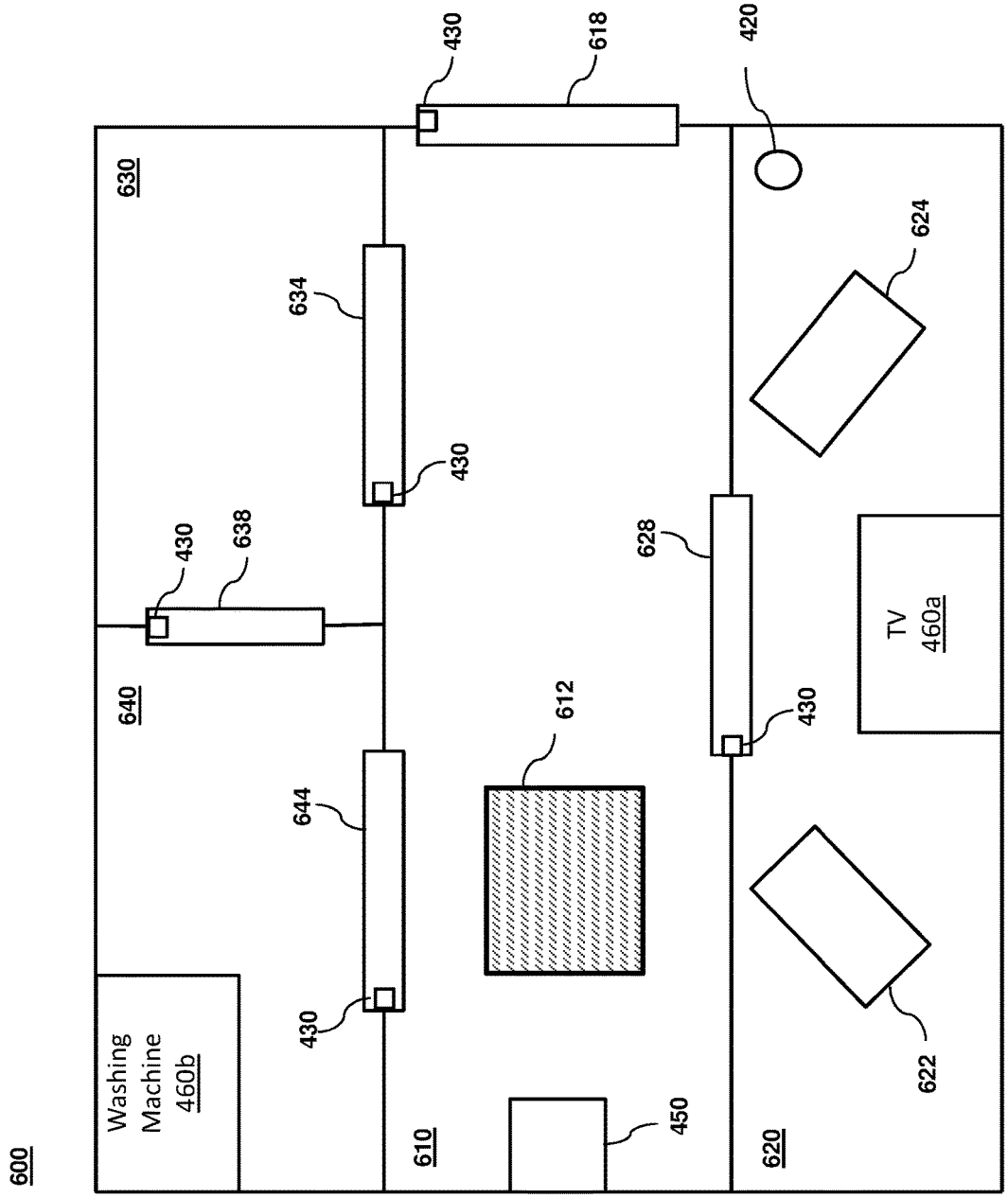
Figure 6B:
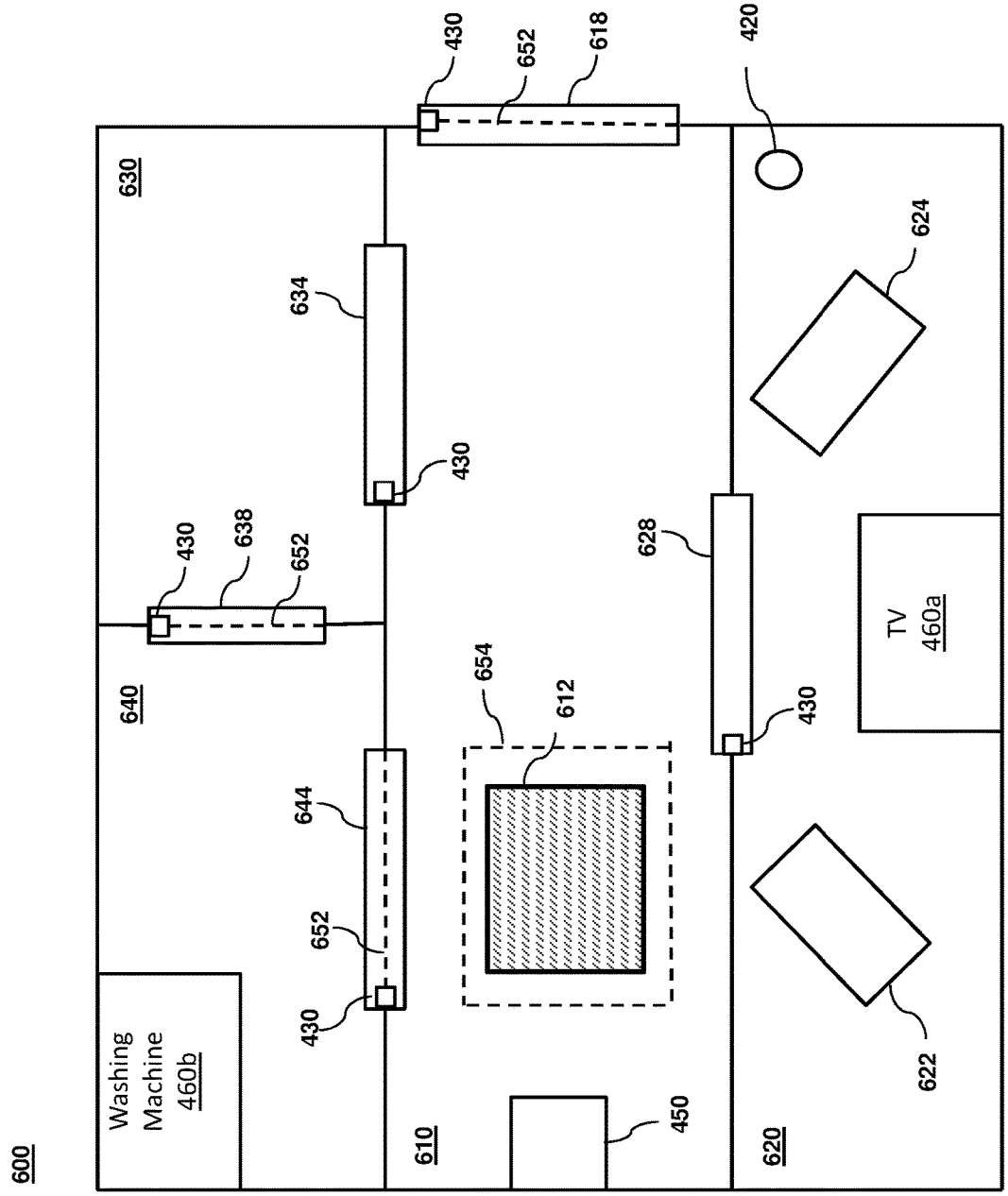

The method 500 beings at block 502 and includes activating a group of one or more laser barriers to define a functional area. The group of one or more laser barriers can be generated by any number of fixed laser barrier device(s) 430, movable laser barrier device(s) 440 and laser barrier projector device(s) 450 and the group of laser barriers may be activated by activating the corresponding laser barrier devices. The group of one or more laser barriers can be activated by the controller 410. In some embodiments, the group may be user selected or may be automatically determined by the controller 410 based on stored rules, as described above. FIG. 6A shows an example embodiment of a floor plan of a house 600 in which an autonomous roving vehicle 420 is configured to operate (e.g., as a vacuum cleaner). As shown, the house 600 has a first room 610 having a rug 612 and a laser barrier projector device 450, a second room 620 having a first couch 622, a second couch 624 and a smart TV 460a, a third room 630 and a fourth room 640 having a smart washing machine 460b. The house 600 includes a plurality of doorways 618, 628, 634, 644 between the rooms and leading to the outside, and each doorway includes a fixed laser barrier device 430. FIG. 6B shows an example of an activation of a group of one or more laser barriers to define a functional area. As shown, the controller has activated fixed laser barrier devices 430 in three doorways 618, 638, 644 to create laser barriers 652 across the respective doorways and thereby creating a functional area that includes the first room 610, second room 620, and third room 630, but excludes the fourth room 640 and the area outside the house. As rug 612 may present a potential hazard to autonomous roving vehicle 420 (e.g., the rug is thick and the vehicle might get stuck on it), controller 410 has also activated laser barrier projector device 450 to project a laser barrier 654 around the rug 612, according to the example embodiment shown in FIG. 6B. With the functional area defined by the laser barriers, the autonomous roving vehicle 420 is now free to roam around the functional area into any space that is not prevented by a laser barrier 652, 654 or physically occupied by another object, such as couches 622, 624.

Figure 6C:
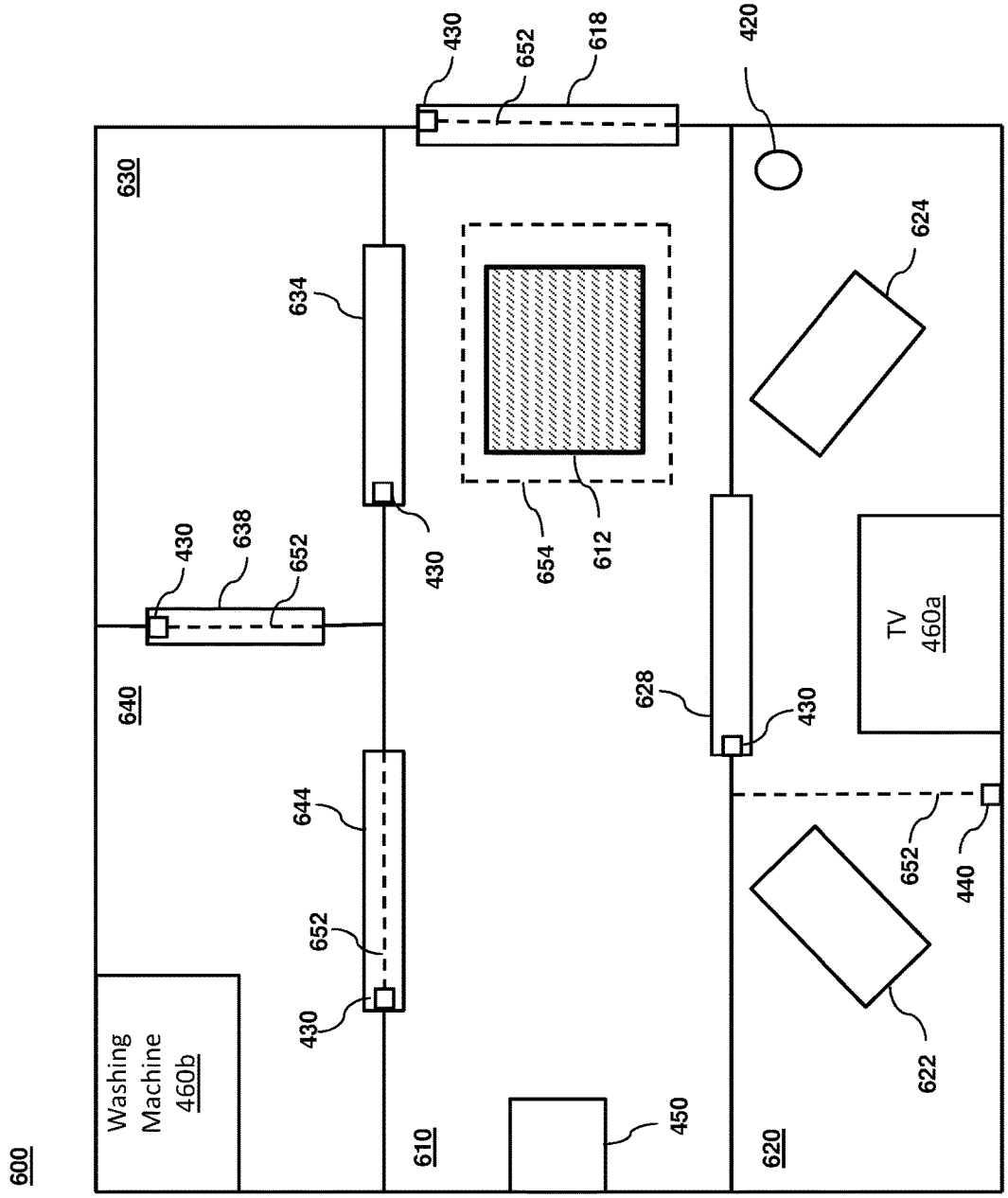

As described previously above, in some embodiments, activating a group of one or more laser barriers can be based on a set of rules (e.g., rules stored by controller 410). According to some embodiments, the set of rules may specify changes in the functional area based on a time period, activity of one or more devices (e.g., IoT devices 460) and/or people, and/or changes in the location of objects (e.g., rug 612). For example, the rules may include a rule that specifies that the autonomous roving device 420 should be prevented from coming into contact with a rug 612 as shown in FIG. 6B. But, as shown in FIG. 6C, the rug 612 has been moved to the other side of the room and based on the rules, the controller 410 can determine that the projected laser barrier 654 needs to be moved and can instruct the laser barrier projector device 450 to project the laser barrier 654 to the other side of the room around the new location of rug 612. According to some embodiments, the controller 410 may learn that the rug 612 has been moved based on a user input providing an indication of the move, or based on image recognition performed on images of the room obtained from an image capture device, such as an image capture device associated with laser barrier projector device 450. According to some embodiments, the rules may specify that the functional area is a first area during a first time period and the functional area is a second area during a second time period. he first area can be defined by an exclusive activation of a first group of one or more laser barriers and the second area can be defined by an exclusive activation of a second group of one or more laser barriers. In other words, if a laser barrier is not selected for activation, then it is deactivated or turned off.

In some embodiments, activating a group of one or more laser barriers may include activating one or more lasers or laser barrier devices (e.g., fixed laser barrier devices 430) installed in one or more corresponding doorways. Each of the lasers or laser devices can be configured to provide a laser beam across the respective doorway at a height that corresponds to a height of a sensor 422 (e.g., a sensor for detecting laser barriers) on the autonomous roving vehicle 420. In some embodiments, activating the group of one or more laser barriers can include activating a projection unit (e.g., laser barrier projector device 450) configured to project a laser-based shape onto a surface (i.e., a projected laser barrier), such as the floor. In some embodiments, the projection unit may be configured to change the size and/or shape of the projected laser barrier in response to receiving a signal or instruction from the controller 410.

According to some embodiments, the rules can include an instruction to prevent the autonomous roving vehicle 420 from approaching a delicate object and the method 500 can further include activating the projection unit to project a first laser-based shape onto a floor of a room and around the delicate object placed at a first location on the floor of the room, determining, using image recognition techniques, that the delicate object has been moved from the first location to a second location on the floor of the room, and instructing the projection unit to project a second laser-based shape onto the floor of the room and around the delicate object at the second location on the floor of the room. For example, the controller 410 may receive an image from an image capture device pointed at an environment (e.g., a room), determine that a delicate object has been relocated within the room using image recognition techniques, and generate a signal to change the shape or projected location of the a projected laser barrier to encompass the delicate object at the new location.

In some embodiments, the rules can specify that a room (or other area) having an active attention-requiring device shall be excluded from the functional area and that a room having an active noisy device shall be included in the functional area. According to some embodiments, attention-requiring devices may include devices that require a user's attention and/or focus, such as one or more of a TV, a computer, a telephone, a radio, a speaker, an instrument (electronic or traditional) or the like, and noisy devices may include devices that are generally noisy that a user may tend to want to avoid being in the same room with, such as a dishwashing machine, a laundry machine and a dryer. In this way, the controller 410 can make determinations about what is occurring in the environment (e.g., someone is watching TV 460*a*, the washing machine 460*b* is being run, etc.), and in real-time may automatically configure or reconfigure the functional area in a manner designed to reduce interference with the activities of the occupants of the environment or realize harmonization with other devices (e.g., by instructing the autonomous roving vehicle 420 to perform noisy vacuuming in a room that already has a noisy washing machine 460*b* being run).

Next, as shown at block 504, the method includes activating the autonomous roving vehicle 420. For example, controller 410 may activate autonomous roving vehicle 420 so that it may begin roving around performing a function within an environment, such as vacuuming the house 600 shown in FIG. 6B. As described above previously, the autonomous roving vehicle 420 may include one or more sensors 422 capable of detecting a laser barrier, such as laser barriers 652, 654 shown in FIG. 6B. The autonomous roving vehicle can be configured to autonomously rove within the functional area and change direction to remain within the functional area upon detecting a laser barrier. For example, as shown in FIG. 6B, the autonomous roving vehicle 420 may leave the second room 620 and enter the first room 610 but will be prevented from going outside upon approaching or coming into contact with the laser barrier 652 in the doorway 618 leading outside and will further be prevented from coming into contact with the rug 612 upon approaching or coming into contact with the laser barrier 654 projected around the rug 612 by the laser barrier projector device 450.

As shown in FIG. 6C, the method 500 may further include redefining the functional area by activating a movable laser barrier device 440 placed in the environment by a user. As described previously above, such movable laser barrier devices 440 may be placed in an ad hoc manner by a user and can be manually activated by a user or remotely activated by the controller 410 based on user-input rules.

According to some embodiments, the autonomous roving vehicle may include a vacuum cleaner and activating the autonomous roving vehicle includes activating the vacuum cleaner. Similarly, in some embodiments, the autonomous roving vehicle may include a lawn mower and activating the autonomous roving vehicle includes activating the lawn mower.

Additional processes may also be included. It should be understood that the processes depicted in FIG. 5 represent illustrations, and that other processes may be added or existing processes may be removed, modified, or rearranged without departing from the scope and spirit of the present disclosure.

Although this disclosure is generally directed to defining a functional area of operation of an autonomous roving vehicle 420 using laser barriers, other embodiments that alternatively use floor strip lighting (e.g., LED lights mounted in the floor and spaced apart by some incremental distance to form a detectable boundary) or patterned tape are also contemplated. According to some embodiments, LED lights may be installed in a translucent flooring and may be detectable by an optical sensor of the autonomous roving vehicle 420 in a manner similar to that described with respect to the laser barriers and patterned tape may be detected by obtaining images of the patterned tape by an image capture device of the autonomous roving vehicle 420 and applying image recognition techniques to the patterned tape to recognize the tape as representing a barrier. For example, patterned tape may be applied to the ground by a user and the pattern included on the tape may be recognized by the system as representing a boundary that the autonomous roving vehicle 420 should not cross.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    activating, by a controller, a group of one or more laser barriers to define a functional area;
    activating an autonomous roving vehicle comprising one or more sensors capable of detecting a laser barrier, the autonomous roving vehicle being configured to autonomously rove within the functional area and responsive to detecting a laser barrier from the group of the one or more laser barriers by the one or more sensors, alter a direction of travel to remain within the functional area, wherein activating a group of one or more laser barriers is based on a set of rules, wherein the set of rules specify changes in the functional area based on a time period, activity of one or more devices and/or people, and/or changes in a location of objects, and
    wherein the set of rules specify that a room having an active attention-requiring device shall be excluded from the functional area and that a room having an active noisy device shall be included in the functional area.

2. The computer-implemented method of claim 1, wherein the autonomous roving vehicle further comprises a vacuum cleaner and activating the autonomous roving vehicle comprises activating the vacuum cleaner.

3. The computer-implemented method of claim 1, wherein the set of rules specify that the functional area is a first area during a first time period and the functional area is a second area during a second time period, wherein the first area is defined by an exclusive activation of a first group of one or more laser barriers and the second area is defined by an exclusive activation of a second group of one or more laser barriers.

4. The computer-implemented method of claim 1, wherein activating the group of one or more laser barriers comprises activating one or more lasers installed in one or more corresponding doorways, each of the lasers being configured to provide a laser beam across the respective doorway at a height that corresponds to a height of a sensor on the autonomous roving vehicle.

5. The computer-implemented method of claim 1, wherein activating the group of one or more laser barriers comprises activating a projection unit configured to project a laser-based shape onto a surface.

6. The computer-implemented method of claim 5, wherein the set of rules comprise an instruction to prevent the autonomous roving vehicle from approaching a delicate object and the method further comprises:
    activating the projection unit to project a first laser-based shape onto a floor of a room and around the delicate object placed at a first location on the floor of the room;
    determining, using image recognition techniques, that the delicate object has been moved from the first location to a second location on the floor of the room; and instructing the projection unit to project a second laser-based shape onto the floor of the room and around the delicate object at the second location on the floor of the room.

7. The computer-implemented method of claim 1, wherein:
attention-requiring devices comprise one or more of a TV, a computer, a telephone, a radio, a speaker, and an electronic instrument; and
noisy devices comprise one or more of a dishwashing machine, a laundry machine and a dryer.

8. The computer-implemented method of claim 1, wherein the autonomous roving vehicle further comprises a lawn mower and activating the autonomous roving vehicle comprises activating the lawn mower.

9. A system comprising:
one or more laser barriers;
a controller configured to selectively activate and/or deactivate a selection of the one or more laser barriers to define a functional area; and
an autonomous roving vehicle comprising one or more sensors capable of detecting a laser barrier, the autonomous roving vehicle being configured to autonomously rove within the functional area and responsive to detecting a laser barrier of the one or more laser barriers by the one or more sensors, alter a direction of travel to remain within the functional area wherein activating a group of one or more laser barriers is based on a set of rules, wherein the set of rules specify changes in the functional area based on a time period, activity of one or more devices and/or people, and/or changes in a location of objects, and
wherein the set of rules specify that a room having an active attention-requiring device shall be excluded from the functional area and that a room having an active noisy device shall be included in the functional area.

10. The system of claim 9, wherein the autonomous roving vehicle further comprises one or more of a vacuum cleaner and a lawn mower.

11. The system of claim 9, wherein at least one of the laser barriers comprises a laser beam disposed in a fixed position across a doorway.

12. The system of claim 11, wherein the controller is further configured to:
receive one or more signals from one or more other devices; and
redefine the functional area based on the one or more signals from the one or more other devices.

13. The system of claim 12, wherein the one or more signals from one or more other devices comprises a signal from a television indicating that the television is turned on and the controller redefines the functional area to prevent the autonomous roving vehicle from entering a room housing the television.

14. The system of claim 9, wherein at least one of the laser barriers is removeably positioned by a user.

15. The system of claim 9, wherein at least one laser barrier is a shape projected onto a surface by a mounted laser projection unit.

16. The system of claim 15, wherein the mounted laser projection unit is configured to change the shape or projected location of the at least one laser barrier in response to receiving a signal from the controller.

17. The system of claim 16, wherein the controller is further configured to:
receive an image from an image capture device pointed at a room;
determine, using image recognition techniques, that a delicate object has been relocated to a new location within the room; and
generate a signal to change the projected location of the at least one laser barrier to encompass the delicate object at the new location.

18. A computer program product comprising a non-transitory computer readable storage medium having program instructions embodied therewith the program instructions executable by a computer processor to cause the computer processor to perform a method comprising:
activating, by a controller, a group of one or more laser barriers to define a functional area;
activating an autonomous roving vehicle comprising one or more sensors capable of detecting a laser barrier, the autonomous roving vehicle being configured to autonomously rove within the functional area and responsive to detecting a laser barrier from the group of the one or more laser barriers by the one or more sensors, alter a direction of travel to remain within the functional area, wherein activating a group of one or more laser barriers is based on a set of rules, wherein the set of rules specify changes in the functional area based on a time period, activity of one or more devices and/or people, and/or changes in a location of objects, and
wherein the set of rules specify that a room having an active attention-requiring device shall be excluded from the functional area and that a room having an active noisy device shall be included in the functional area.

* * * * *